Patented Apr. 4, 1939

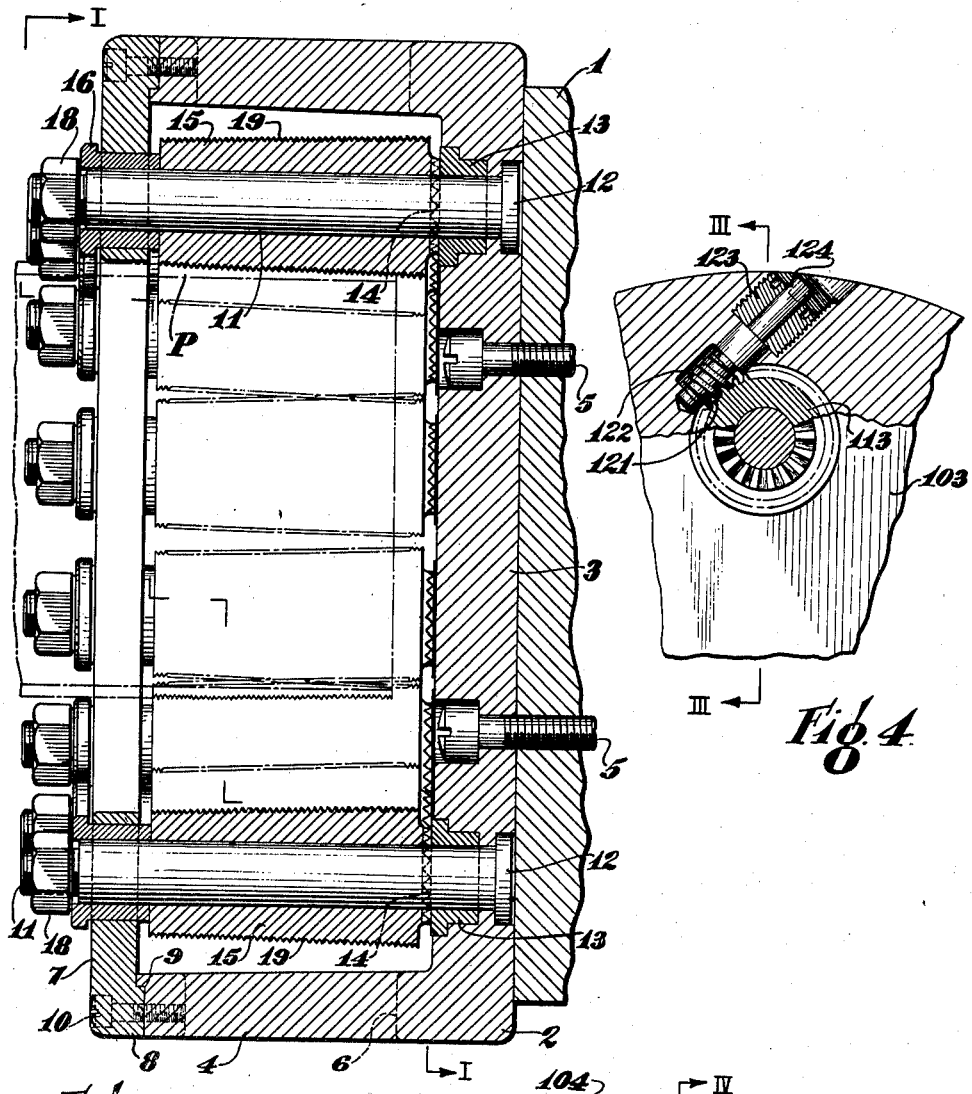
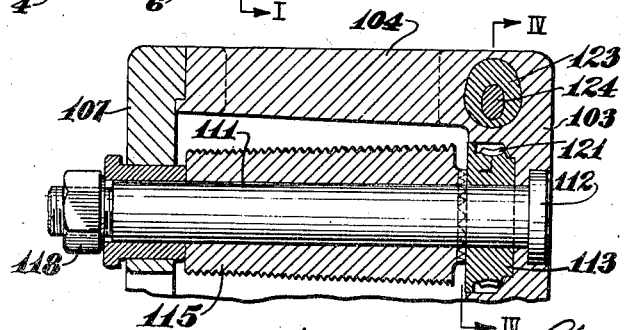

2,153,124

UNITED STATES PATENT OFFICE 2,153,124

CUTTING TOOL

Charles H. Schurr, Cleveland, Ohio, assignor to The Lees-Bradner Company, Cleveland, Ohio, a corporation of Ohio Application December 7, 1935, Serial No. 53,283

3 Claims. (Cl. 29—105)

This invention relates to cutting tools and is particularly applicable to cutting tools having a series of teeth which pass successively through the work being operated upon, such for instance as hobs, milling cutters, dies and the like.

An object of the invention is to provide an improved cutting tool which will be possessed of a relatively long useful life.

Another object is to provide an improved cutting tool which will be simple in construction.

Another object is to provide an improved cutting tool which will be particularly strong and rugged in construction.

Another object is to provide an improved cutting tool in which new cutting edges may be presented to the work.

Another object is to provide an improved cutting tool in which the cutting edges may be easily and accurately adjusted.

Other objects will hereinafter appear.

The invention will be better understood from the description of one practical embodiment thereof illustrated in the accompanying drawings, in which;

Figure 2 is an axial sectional view taken on the line II—II of Figure 1;

Figure 3 is a fragmentary sectional view similar to Figure 2, but showing a modified form of adjusting means; and Figure 4 is a fragmentary sectional view taken on the line IV—IV of Figure 3.

Figure 1:
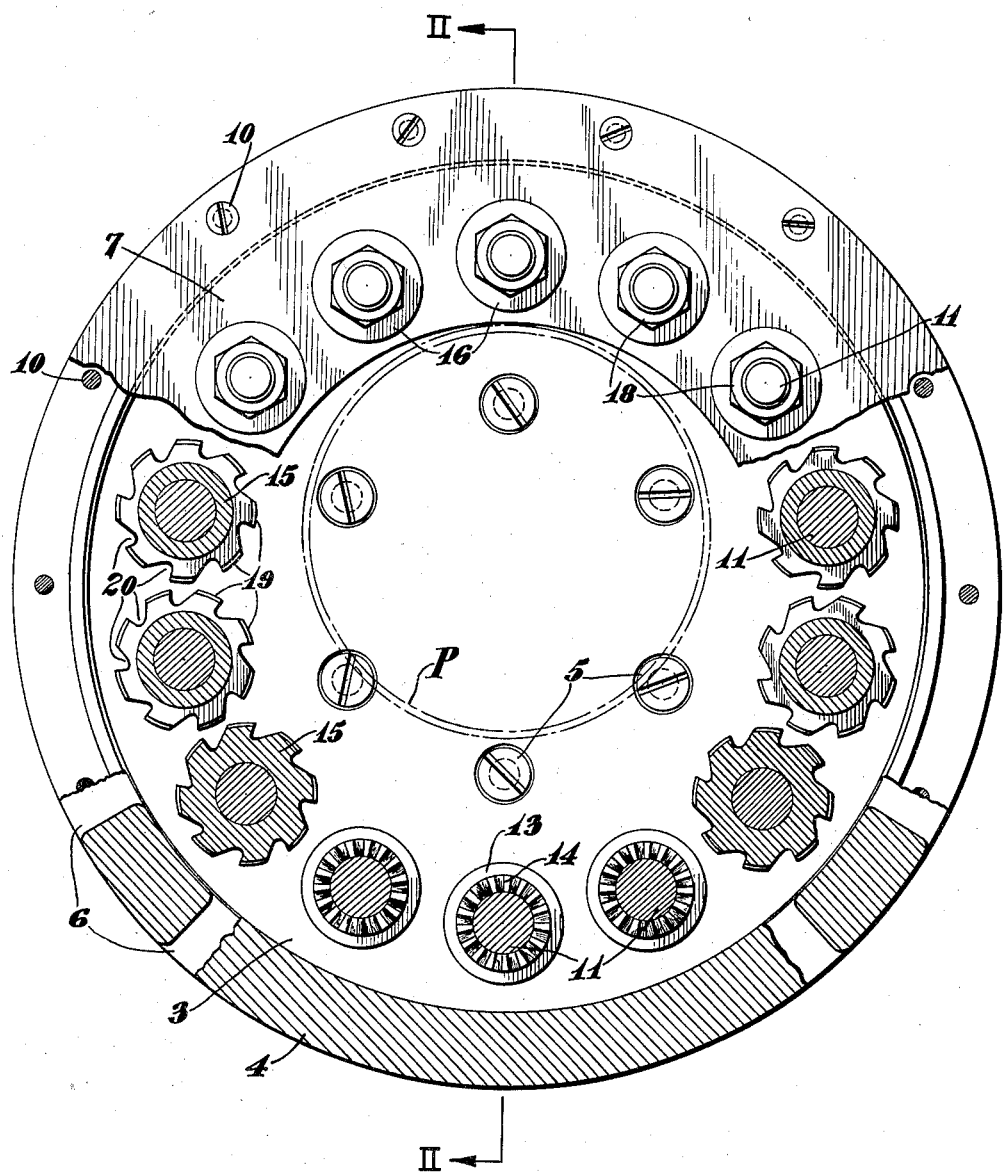
Figure 1 is a front elevational view of a milling cutter for milling external threads embodying the invention, parts being broken away and shown in section on the line I—I of Figure 2.

The tool illustrated is particularly adapted for use in the milling of external threads upon the exterior of relatively large objects, such as oil well casings, and may be conveniently used in a thread milling machine of the type illustrated in my copending application Serial No. 51,879, but, of course, might be used in many other types of machine tools.

As shown in Figure 2, the tool is carried coaxially upon a rotatable spindle 1, driven by the mechanism of the machine tool, and is arranged to engage a piece of work such as a pipe, held and capable of being rotated by suitable chucks (not illustrated) constituting part of the machine tool.

The tool itself, comprises a cup-shaped frame 2 consisting of a disc-like portion or head 3 and a cylindrical marginal flange 4. The former is connected to the tool spindle by any desired means, such as bolts or screws 5. The flange is shown as lightened by the provision of slots 6 therethrough.

A disc-like cap 7 having an annular flange 8 seated in a recess 9 on the outer face of the flange 4 of the frame is secured thereto in any desired manner as by cap screws 10.

A plurality of headed shafts or axles 11 pass through aligned apertures in frame 3 and ring 7, the non-circular heads 12 being received within complementary non-circular recesses in the head of the frame to hold them against rotation. Also received in the head of the frame and within stepped non-circular recesses are bushing-like clutch members 13, each provided on its outer face with serrations or clutch surfaces 14.

These serrations are complementary to similar serrations formed in the end of a cutter element 15 surrounding the shaft. An axially movable bushing 16 likewise surrounds the shaft and passes through the aperture in the ring 7, bearing against the end of the cutter element and transmitting to it pressure derived from a nut 18 threaded on the end of the shaft 11. Thus the clutch surfaces of members 13 and cutters 15 may be held in tightly wedged engagement.

Each cutter element is provided with one or more circumferentially extending projections or serrations 19, these being interrupted by axially extending grooves or flutes 20 to form a series of peripherally disposed teeth or rows of teeth, and is so adjusted that the leading or cutting edges of one tooth or of one row of teeth lie in a plane defined by the axis of its shaft 11 and the axis of the tool spindle 1. Rows of teeth may be formed parallel the axis of shaft 11, on a generally cylindrical cutter element, and will then (if the shafts 11 are parallel the axis of spindle 1) produce threads of a uniform depth. They may be inclined to the axis of shaft 11, and as shown in Figure 1 such a tapered or conical form may be used to produce a tapered pipe thread. Also, either tapered or cylindrical cutters may be mounted on axes inclined with respect to that of the spindle 1. Due to the arcuate shape of the external surface of each cutting tooth, and its relation to the surface of the work, it will be apparent that the cutter elements may be formed as true cylindrical or conical surfaces with axially extending notches or flutes and that the arcuate external surface of the teeth will afford ample relief for these teeth in ordinary cutting operations. However, should it be desired, additional relief may be given to the teeth, as will be readily understood by those skilled in this art.

With the cutter elements all clamped tightly between their respective bushings and clutch elements, a strong and rigid tool is provided. When the teeth engaging the work become dull, it is only necessary to loosen the nuts 18 and move the bushings 16 outwardly sufficiently to permit the clutch surfaces of cutter 15 and element 13 to be moved relative each other, whereupon each cutter may be adjusted to bring a new row of cutting teeth into the plane through the axis of its shaft and the spindle.

It will be apparent that this may be most readily done if the clutch serrations correspond exactly to the arrangement of the series of teeth, while this adjustment can also be easily effected if the number of serrations is any multiple of the number of teeth. After moving the various cutters, it is only necessary to tighten nuts 18 and the tool is again ready for use. This rearrangement of the cutters consumes very little time and requires no gaging, measuring or other difficult adjustment. It also will be apparent that the life of the tool will be much longer than would that of one having a single set of cutting teeth, as it will be in proportion to the life of such a tool as one is to the number of the series of teeth on each cutter element.

If it is desired that the tool be used as a milling cutter, the cutter elements may each consist of annularly arranged series of teeth, while if it is desired to use it in the manner of a hob, these teeth will be disposed in helical arrangement. With the former type of cutter, it is immaterial whether each cutter element be advanced by the same number of teeth at each adjustment; while in the latter, it will be important to advance all elements in a predetermined relation, so that the teeth presented to the work may all lie upon a desired helix described about the cutter spindle axis.

In Figures 3 and 4 (whereon parts corresponding to those of the first two figures are indicated by reference numerals one hundred higher than the numerals above referred to) the clutch element 113 has been shown as rotatably mounted in the frame head 103 and has formed on its exterior a worm wheel 121 meshing with a worm 122 journalled in the frame. The worm is shown as held in place by a bushing 123 threaded into the frame, and having a shank 124 passing through the bushing. The squared end of this shank may be engaged by a wrench or the like to rotate the same, and used to adjust the clutch 113 and through it the cutter element 115 about its axis to bring its cutting surfaces into correct alignment.

While the invention has been illustrated as applied to an internal type of cutter, it will be apparent that it may readily be applied to a cutter of the external type, and that modifications in the arrangement of the frame structure to so adapt it and to fit it to any type of machine tool may be readily made.

I claim:

1. A cutting tool comprising a frame having two parallel radially extending walls, a plurality of annularly arranged pivots passing through one of said walls, a clutch member secured to the frame surrounding each pivot and having a plurality of uniformly spaced clutch faces, a cutter member mounted on each pivot provided with a plurality of uniformly spaced cutting edges and similarly spaced clutch faces complementary to those of the clutch member and axially movable into and out of engagement therewith, and clamping means holding said faces in engagement with each other.

2. A cutting tool comprising a frame having two parallel radially extending walls, a plurality of annularly arranged pivots passing through one of said walls, a clutch member secured to the frame surrounding each pivot and having a plurality of uniformly spaced clutch faces, a cutter member mounted on each pivot provided with a plurality of uniformly spaced cutting edges and similarly spaced clutch faces complementary to those of the clutch member and axially movable into and out of engagement therewith, and clamping means holding said faces in engagement with each other, and means for adjusting said clutch member about the axis of said pivot.

3. A cutting tool comprising a frame having two parallel radially extending walls, a plurality of annularly arranged pivots passing through one of said walls, a clutch member secured to the frame surrounding each pivot and having a plurality of uniformly spaced clutch faces, a cutter member mounted on each pivot provided with a plurality of uniformly spaced cutting edges and similarly spaced clutch faces complementary to those of the clutch member and axially movable into and out of engagement therewith, and clamping means holding said faces in engagement with each other, a worm secured to said clutch member for adjusting the same about the axis of the pivot, and a worm wheel journalled in the frame meshing with said worm.

CHARLES H. SCHURR.